(12) United States Patent
Cohen et al.

(10) Patent No.: US 8,910,143 B2
(45) Date of Patent: Dec. 9, 2014

(54) CONVERSION SYSTEM AND METHOD FOR USE IN UPGRADING A MONITORING SYSTEM

(75) Inventors: Mitchell Dean Cohen, Carson City, NV (US); Ronald Wilson, South Lake Tahoe, CA (US); Han Tran, Gardnerville, NV (US); Charles Ogles, Gardnerville, NV (US); Landon Boyer, Minden, NV (US)

(73) Assignee: General Electric Company, Schenectady, NY (US)

( * ) Notice: Subject to any disclaimer, the term of this patent is extended or adjusted under 35 U.S.C. 154(b) by 864 days.

(21) Appl. No.: 12/885,992

(22) Filed: Sep. 20, 2010

(65) Prior Publication Data

US 2012/0072899 A1    Mar. 22, 2012

(51) Int. Cl.
*G06F 9/445* (2006.01)
*G06F 9/45* (2006.01)
*G06F 9/00* (2006.01)
*G06F 3/00* (2006.01)
*H04L 29/08* (2006.01)
*H04L 12/24* (2006.01)

(52) U.S. Cl.
CPC ........ *H04L 41/0823* (2013.01); *H04L 67/2823* (2013.01); *H04L 67/12* (2013.01); *H04L 67/125* (2013.01); *H04L 41/0846* (2013.01)
USPC ............... 717/174; 717/136; 713/1; 713/100; 719/327

(58) Field of Classification Search
USPC ........................................................ 717/174
See application file for complete search history.

(56) References Cited

U.S. PATENT DOCUMENTS

| | | | |
|---|---|---|---|
| 5,122,948 A * | 6/1992 | Zapolin | 340/3.53 |
| 5,313,614 A | 5/1994 | Goettelmann et al. | |
| 5,539,787 A | 7/1996 | Nakano et al. | |
| 5,551,015 A | 8/1996 | Goettelmann et al. | |
| 5,581,558 A | 12/1996 | Horney, II et al. | |
| 5,694,580 A | 12/1997 | Narita et al. | |
| 5,960,182 A | 9/1999 | Matsuoka et al. | |
| 5,963,740 A | 10/1999 | Srivastava et al. | |
| 6,151,390 A | 11/2000 | Volftsun et al. | |
| 6,226,762 B1 * | 5/2001 | Foote et al. | 714/48 |

(Continued)

FOREIGN PATENT DOCUMENTS

WO    2006017944 A1    2/2006

OTHER PUBLICATIONS

Search Report and Written Opinion from corresponding EP Application No. 11180142.9-1225 dated Dec. 19, 2011.

(Continued)

*Primary Examiner* — James D Rutten
(74) *Attorney, Agent, or Firm* — Fletcher Yoder PC

(57) ABSTRACT

A conversion system for use with a first monitoring system includes an interface module for receiving a plurality of hardware configuration settings associated with the first monitoring system and a conversion module coupled to the interface module for converting the plurality of hardware configuration settings into a plurality of software configuration settings for use in a second monitoring system. The plurality of hardware configuration settings are established to enable the first monitoring system to monitor the operation of a first machine, and the plurality of software configuration settings are established to enable the second monitoring system to monitor the operation of at least one of the first machine and a second machine.

20 Claims, 5 Drawing Sheets

(56) References Cited

U.S. PATENT DOCUMENTS

| | | | |
|---|---|---|---|
| 6,237,053 B1 | 5/2001 | Herrod et al. | |
| 6,493,594 B1 | 12/2002 | Kraml | |
| 6,598,223 B1 * | 7/2003 | Vrhel et al. | 717/174 |
| 6,671,633 B2 * | 12/2003 | Kramb et al. | 702/34 |
| 7,188,171 B2 | 3/2007 | Srinivasan et al. | |
| 7,454,745 B2 * | 11/2008 | Aridor et al. | 717/122 |
| 7,904,181 B2 * | 3/2011 | Aupperlee et al. | 700/1 |
| 2003/0171846 A1 * | 9/2003 | Murray et al. | 700/245 |

OTHER PUBLICATIONS

Kostic, T. et al., "Towards the Formal Integration of Two Upcoming Standards: IEC61970 and IEC61850", Lescope. Large Engineering Systems Conference on Powerengineering Conference Proceedings. Energy for the Future, XX, XX, pp. 24-29, May 7, 2003.

Kezunovi, M. et al., "Automated Monitoring and Control Using New Data Integration Paradigm", 20050103; 20050103-20050106, pp. 66A-66A, Jan. 3, 2005.

* cited by examiner

CONVERSION SYSTEM AND METHOD FOR USE IN UPGRADING A MONITORING SYSTEM

BACKGROUND OF THE INVENTION

The present application relates generally to monitoring systems and, more particularly, to a conversion system for use in upgrading a monitoring system.

Known machines may exhibit vibrations or other abnormal behavior during operation. One or more sensors may be used to measure and/or monitor such behavior and to determine, for example, an amount of vibration exhibited in a motor drive shaft, a rotational speed of the motor drive shaft, and/or any other suitable operational characteristic of an operating machine or motor. Often, sensors are coupled to a monitoring system that includes a plurality of monitors. At least some known monitoring systems receive signals representative of measurements from one or more sensors, and in response, perform at least one processing step on the signals, prior to transmitting the modified signals to a diagnostic platform that displays the measurements to a user in a format usable by the user.

At least some known machine monitoring systems include a plurality of hardware configuration settings that control the operation of the monitoring system. For example, one or more jumpers may be installed on one or more monitors to control the operation of each monitor and/or the monitoring system. If the monitoring system is upgraded to a monitoring system that is software configurable, each jumper setting and/or hardware setting typically must be recorded and the software configuration settings of the upgraded monitoring system must be individually set. Such a conversion process may be time-consuming, and depending on the number of settings to be set, one or more configuration settings may be erroneously converted. Moreover, one or more hardware components of the monitoring system may not be supported by the upgraded monitoring system. As such, an inquiry may need to be individually conducted for each hardware component to determine if the monitoring system is upgradeable. Such inquiries may be time consuming and may increase the overall time and cost of upgrading known monitoring systems.

BRIEF DESCRIPTION OF THE INVENTION

In one embodiment, a conversion system for use with a first monitoring system is provided that includes an interface module for receiving a plurality of hardware configuration settings associated with the first monitoring system and a conversion module coupled to the interface module for converting the plurality of hardware configuration settings into a plurality of software configuration settings for use in a second monitoring system. The plurality of hardware configuration settings are established to enable the first monitoring system to monitor the operation of a first machine, and the plurality of software configuration settings are established to enable the second monitoring system to monitor the operation of at least one of the first machine and a second machine.

In another embodiment, a monitoring system conversion assembly is provided that includes a first monitoring system including a plurality of hardware configuration settings and a conversion system. The conversion system includes an interface module for receiving the plurality of hardware configuration settings and a conversion module coupled to the interface module for converting the plurality of hardware configuration settings into a plurality of software configuration settings for use in a second monitoring system. The plurality of hardware configuration settings are established to enable the first monitoring system to monitor the operation of a first machine, and the plurality of software configuration settings are established to enable the second monitoring system to monitor the operation of at least one of the first machine and a second machine.

In yet another embodiment, a method for upgrading a first monitoring system to a second monitoring system is provided that includes receiving a plurality of hardware configuration settings from a first monitoring system and converting the plurality of hardware configuration settings from the first monitoring system into a plurality of software configuration settings for use in a second monitoring system. The plurality of hardware configuration settings are established to enable the first monitoring system to monitor the operation of a first machine, and the plurality of software configuration settings are established to enable the second monitoring system to monitor the operation of at least one of the first machine and a second machine.

DETAILED DESCRIPTION OF THE INVENTION

Figure 1:
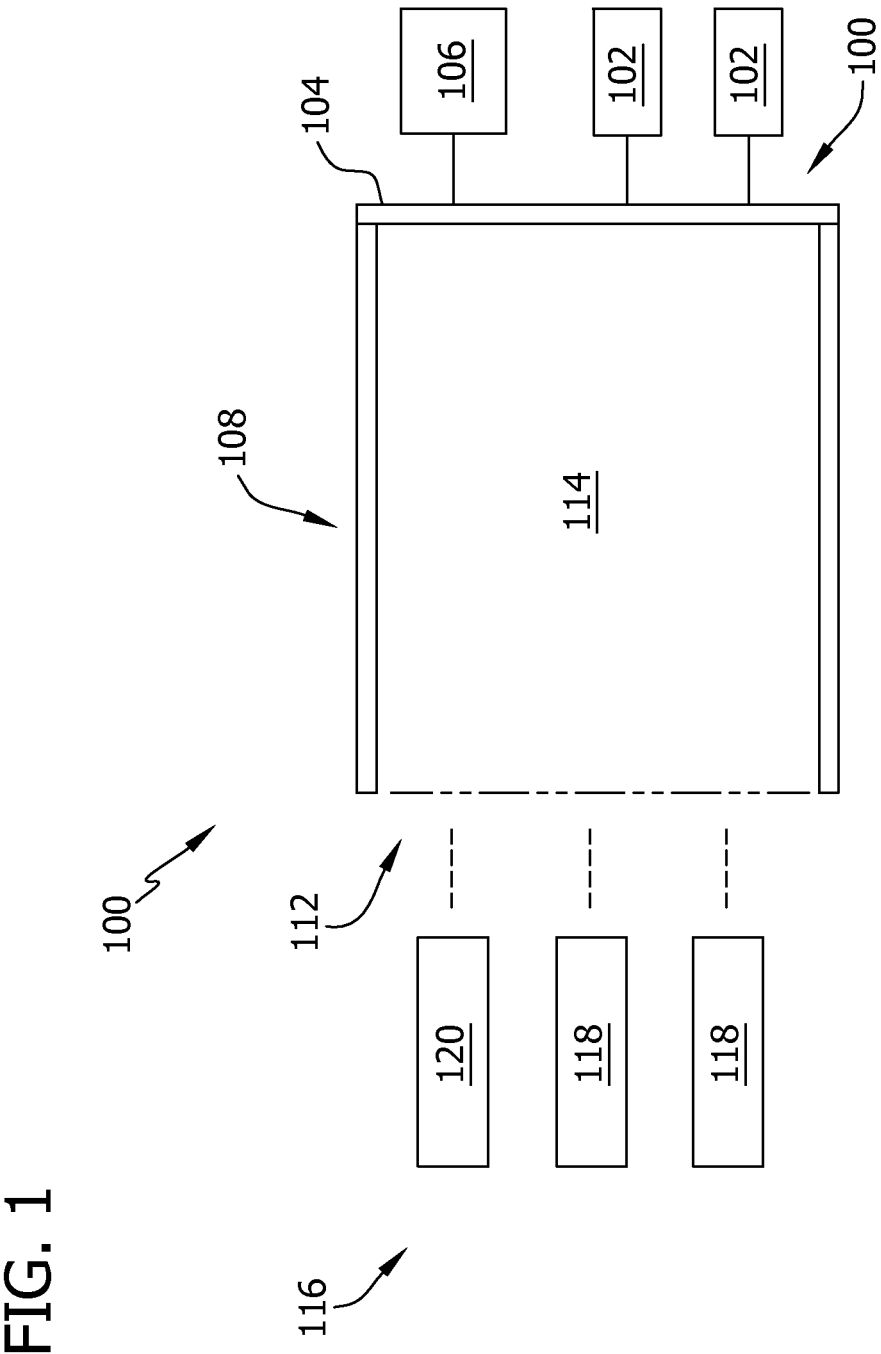
FIG. 1 is a side cross-sectional view of an exemplary monitoring system that may be used to monitor the operation of a machine.

FIG. 1 is a side cross-sectional view of an exemplary machine monitoring system 100 that may be used to monitor the operation of a machine (not shown). In the exemplary embodiment, monitoring system 100 monitors at least one operating condition of one or more machines using one or more transducers 102 or other sensors. More specifically, in the exemplary embodiment, a plurality of transducers 102 are coupled to a system backplane 104 that receives signals from transducers 102 that are indicative of measured and/or detected operating conditions of the machine and/or of one or more components of the machine. Moreover, in the exemplary embodiment, monitoring system 100 receives power from a power supply 106 coupled to system backplane 104. Alternatively, monitoring system 100 may receive power from any suitable power source that enables system 100 to function as described herein. In the exemplary embodiment, system backplane 104 includes a monitoring system bus (not shown in FIG. 1) that includes a plurality of conductors (not shown). As used herein, the term "couple" is not limited to a direct mechanical and/or an electrical connection between components, but may also be used to include an indirect mechanical and/or electrical connection between components.

In the exemplary embodiment, system backplane 104 is positioned within a housing 108. More specifically, in the exemplary embodiment, system backplane 104 is positioned in close proximity to, or adjacent to, a rear portion 110 of housing 108. A front portion 112 of housing 108 is open to an external environment. Housing 108 includes a cavity 114 defined therein that is in flow communication with and extends inwardly from front portion 112.

Monitoring system 100, in the exemplary embodiment, includes at least one monitoring module 116. More specifically, in the exemplary embodiment, monitoring system 100 includes at least one transducer monitoring module 118 that processes at least one signal received from transducers 102. As used herein, the term "process" refers to performing an operation on, adjusting, filtering, buffering, and/or altering at least one characteristic of a signal. In the exemplary embodiment, monitoring system 100 includes any number of transducer monitoring modules 118 that enable system 100 to function as described herein. Each monitoring module 118 is coupled to system backplane 104 and is positioned at least partially within housing 108. As such, in the exemplary embodiment, signals from transducers 102 are transmitted to transducer monitoring modules 118 through system backplane 104. Moreover, in some embodiments, at least one signal may be transmitted between different transducer monitoring modules 118.

In the exemplary embodiment, monitoring system 100 also includes at least one system monitoring module 120 that is coupled to system backplane 104 and that is contained at least partially within housing 108. In the exemplary embodiment, system monitoring module 120 receives data and/or status signals transmitted from transducer monitoring modules 118 and/or from other components of monitoring system 100. Module 120 processes and/or analyzes the data and/or status signals prior to transmitting the signals to a remote system (not shown), such as a computer system, for display or output to a user.

Figure 2:
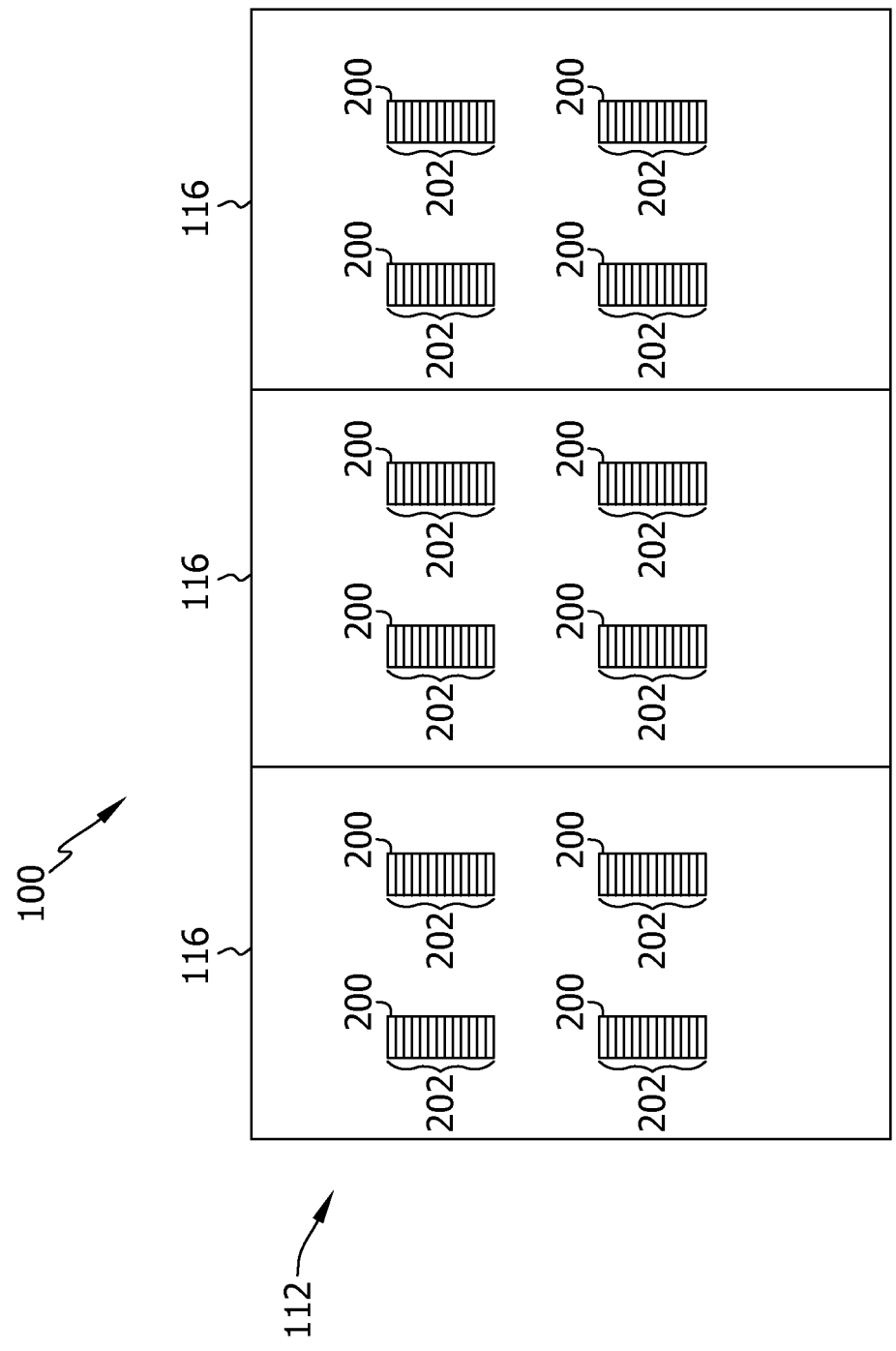
FIG. 2 is a front elevational view of the monitoring system shown in FIG. 1.

FIG. 2 is a front elevational view of front portion 112 of monitoring system 100. Although FIG. 2 only illustrates three monitoring modules 116 positioned within front portion 112, any number of monitoring modules may be positioned within front portion 112 that enables monitoring system 100 to function as described herein. In the exemplary embodiment, each monitoring module 116 is configured by a plurality of hardware-based configuration settings. More specifically, in the exemplary embodiment, each monitoring module 116 includes a plurality of jumpers 200 that are positioned within a plurality of jumper blocks 202. Each jumper 200 is associated with, and determines, a configuration setting, such as a variable, parameter, and/or signal that controls an operation of a respective monitoring module 116 and/or monitoring system 100. For example, jumpers 200 may be used to control an amplitude, a latching mode, a scale factor, and/or any suitable characteristic of one or more signals of monitoring module 116. Alternatively or additionally, each monitoring module 116 may include any other configuration device that enables monitoring system 100 to function as described herein. For example, in one embodiment, monitoring system 100 is at least partially software-configurable such that the configuration settings may be variably programmed via software, such as via one or more configuration files, rather than, or in addition to, being configured via hardware (i.e., via jumpers 200).

Figure 3:
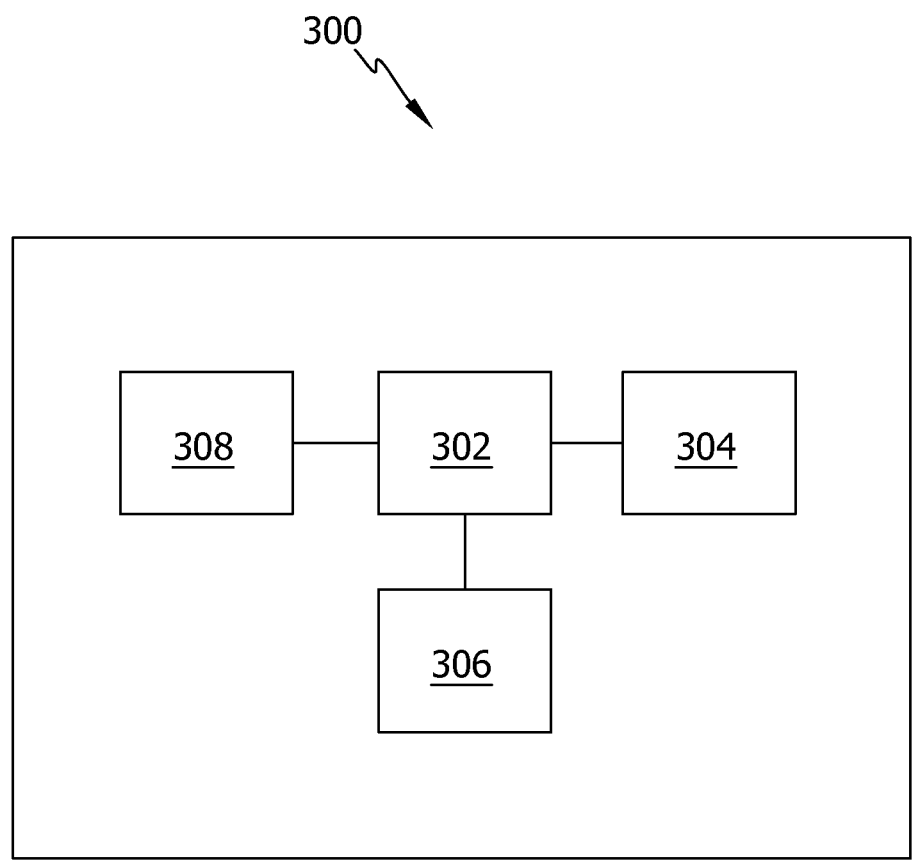
FIG. 3 is a block diagram of an exemplary conversion system that may be used with the monitoring system shown in FIG. 1.

FIG. 3 is a block diagram of an exemplary conversion system 300 that may be used with monitoring system 100 (shown in FIG. 1). In the exemplary embodiment, conversion system 300 includes a processor 302, a display 304, a memory 306, and a communication interface 308. Display 304, memory 306, and communication interface 308 are each coupled to, and are in data communication with, processor 302.

In the exemplary embodiment, processor 302 includes any suitable programmable system including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." Moreover, in the exemplary embodiment, display 304 includes, without limitation, a liquid crystal display (LCD), a cathode ray tube (CRT), a plasma display, and/or any suitable visual output device capable of displaying graphical data and/or text to a user.

Memory 306, in the exemplary embodiment, includes a computer readable medium, such as, without limitation, a hard disk drive, a solid state drive, a diskette, a flash drive, a compact disc, a digital video disc, random access memory (RAM), and/or any suitable storage device that enables processor 302 to store, retrieve, and/or execute instructions and/or data. Memory 306 may include one or more local and/or remote storage devices.

In the exemplary embodiment, communication interface 308 may include, without limitation, a network interface controller (NIC), a network adapter, a transceiver, and/or any suitable communication device that enables conversion system 300 to operate as described herein. Communication interface 308 may connect to a network, to a remote computer system (neither shown), and/or to one or more monitoring systems 100 using any suitable communication protocol, such as, for example, a wired Ethernet protocol or a wireless Ethernet protocol.

Figure 4:
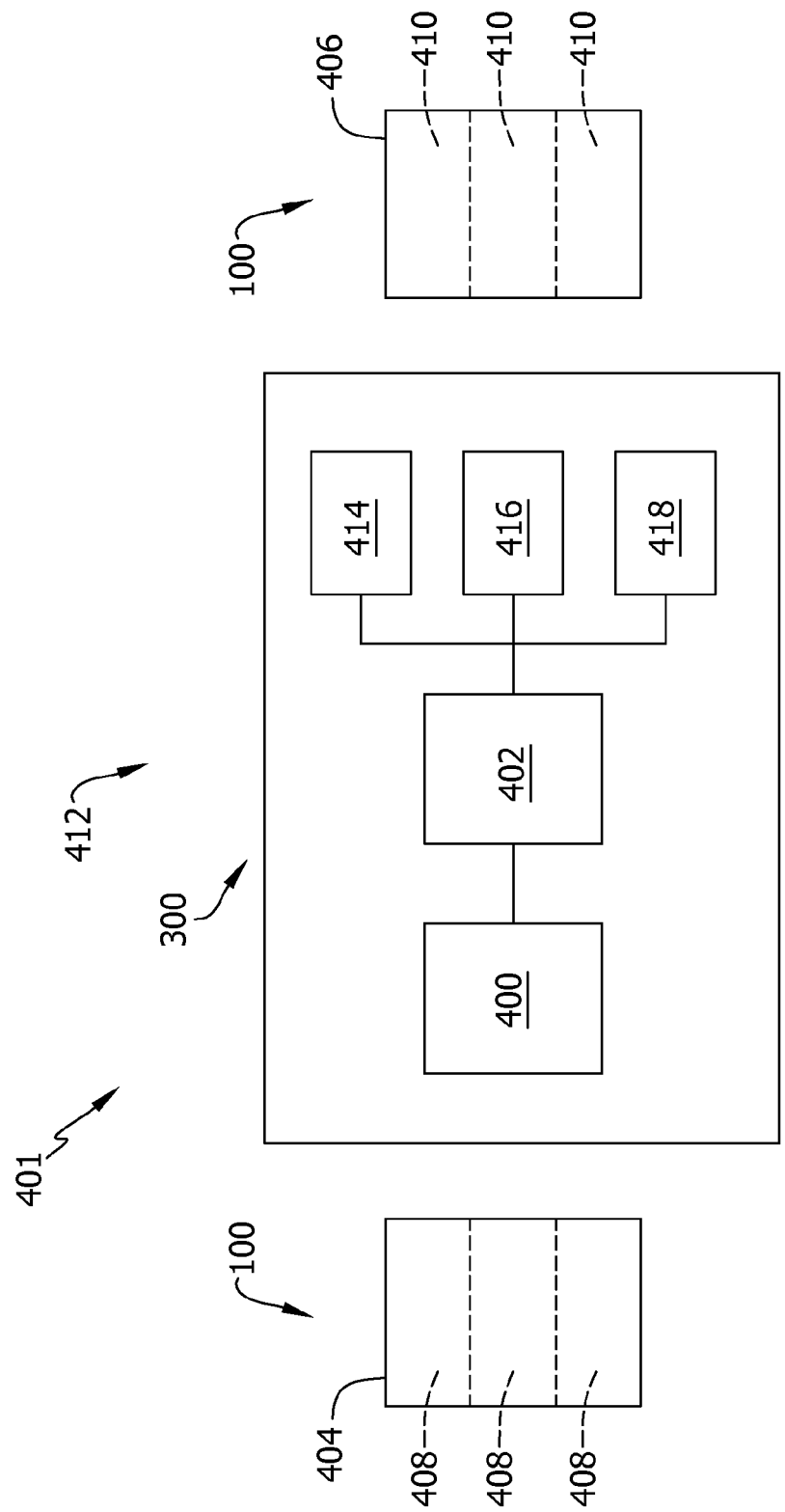
FIG. 4 is a block diagram of a portion of the conversion system shown in FIG. 3.
Figure 5:
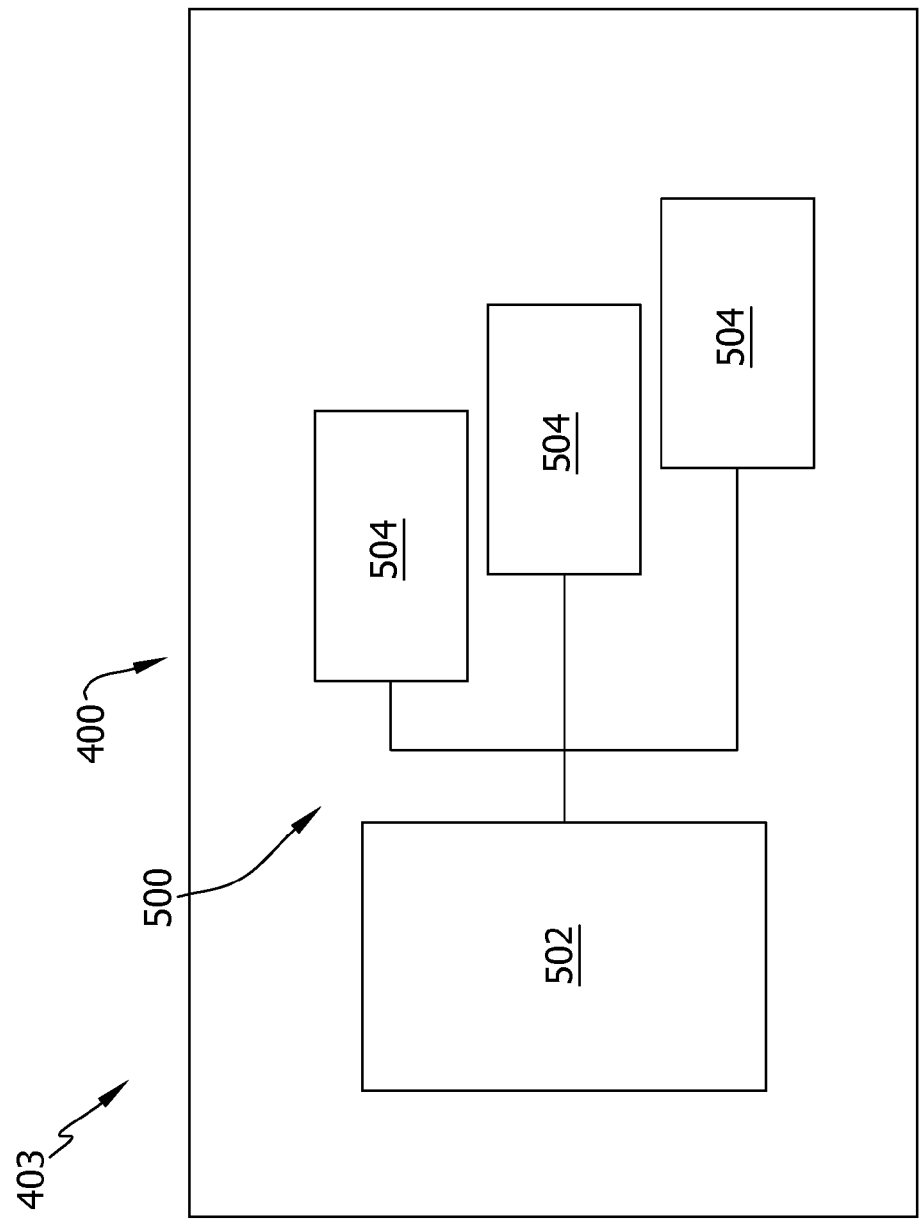
FIG. 5 is a block diagram of an exemplary user interface module that may be used with the conversion system shown in FIG. 3.

FIG. 4 is a block diagram of a portion 401 of conversion system 300 that includes a user interface module 400 and a conversion module 402. FIG. 5 is a block diagram of a portion 403 of user interface module 400. In the exemplary embodiment, user interface module 400 and conversion module 402 are software modules that are stored within memory 306, executed by processor 302, and/or displayed by display 304 (all shown in FIG. 3). Data associated with user interface module 400 and/or conversion module 402 may be transmitted to a remote system (not shown) by communication interface 308 (shown in FIG. 3). Moreover, in the exemplary embodiment, and as described in more detail herein, conversion system 300 converts one or more settings between two different monitoring systems 100, such as between a first monitoring system 404 and a second monitoring system 406.

In the exemplary embodiment, first monitoring system 404 includes one or more monitoring modules 408. Moreover, first monitoring system 404 and/or monitoring modules 408 are configured via one or more jumpers 200 (shown in FIG. 2). In the exemplary embodiment, second monitoring system 406 includes one or more monitoring modules 410. Moreover, in the exemplary embodiment, second monitoring system 406 and/or monitoring modules 410 are configured via software rather than via jumpers 200. In the exemplary embodiment, conversion system 300 enables upgrading and/or retrofitting first monitoring system 404 and/or monitoring modules 408 to second monitoring system 406 and/or monitoring modules 410. As described herein, second monitoring system 406 may be a separate and distinct monitoring system from first monitoring system 404. Alternatively, second monitoring system 406 may be the same as first monitoring system 404 that includes one or more components, such as monitoring modules 408, that have been replaced and/or upgraded, such as with monitoring modules 410. Moreover, in the exemplary embodiment, the combination of conversion system 300, first monitoring system 404, and/or second monitoring system 406 form a monitoring system conversion assembly 412.

In one embodiment, first monitoring system 404 is a 3300 Series Machinery Protection System ("3300 System") manufactured by General Electric Company ("GE") and second monitoring system 406 is a 3500 Series Machinery Protection System ("3500 System") manufactured by GE. In another embodiment, second monitoring system 406 is a 3300 System that includes at least one monitoring module 410 usable with the 3500 System. Alternatively, first monitoring system 404 and/or second monitoring system 406 may be any other system usable with conversion system 300.

In the exemplary embodiment, user interface module 400 includes a graphical user interface (not shown) that is selectively displayed on display 304. Alternatively or additionally, user interface module 400 may include a pointing device, a keyboard, an audio input device, a tablet (none shown), and/or any other device that enables conversion system 300 to function as described herein. In the exemplary embodiment, a user manipulates user interface module 400 to input data into conversion system 300. More specifically, in the exemplary embodiment, the user inputs one or more settings that are representative of a desired configuration of first monitoring system 404 and/or of monitoring modules 408 (hereinafter referred to as a "configuration setting"). Such a desired configuration may include, but is not limited to only including, a list of hardware components and/or monitoring modules 408 that are installed in first monitoring system 404, and/or a position, configuration setting, and/or any other characteristic of one or more jumpers 200 (shown in FIG. 2) currently installed in each monitoring module 408. Alternatively, the configuration settings may be automatically received from first monitoring system 404, such as via a data connection (not shown) coupled between first monitoring system 404 and conversion system 300.

User interface module 400, in the exemplary embodiment, includes a plurality of windows 500 that are displayable on display 304. More specifically, in the exemplary embodiment, user interface module 400 includes a hardware component entry window 502 and at least one configuration setting window 504. In the exemplary embodiment, hardware component entry window 502 is initially displayed to a user. The user enters a list of hardware components that are installed in first monitoring system 404 by manipulating one or more buttons, menus, drop-down boxes, text entry fields, and/or any other data entry component within user interface module 400 that enables conversion system 300 to function as described herein. For example, in the exemplary embodiment, when the user enters a list of monitoring modules 408 that are installed in first monitoring system 404, user interface module 400 then displays a separate configuration setting window 504 to the user on display 304 for each hardware component entered by the user in hardware component entry window 502.

The user, in the exemplary embodiment, inputs one or more hardware-based configuration settings of monitoring module 408 and/or another hardware component into each configuration setting window 504 associated with monitoring module 408 and/or the hardware component. For example, the user enters a list of jumpers 200 that are installed in successive monitoring modules 408 of first monitoring system 404 by manipulating one or more buttons, menus, drop-down boxes, text entry fields, and/or any other data entry component within associated configuration setting windows 504. As each configuration setting is input, an associated configuration parameter within user interface module 400 is set to a value that is representative of the configuration setting input.

In the exemplary embodiment, conversion module 402 receives data representative of the list of hardware components installed in first monitoring system 404, the configuration parameters, and/or the configuration parameter values from user interface module 400. Based on the data received, conversion module 402 initially determines whether first monitoring system 404 can be upgraded and/or retrofitted to second monitoring system 406. For example, in the exemplary embodiment, first monitoring system 404 is a legacy monitoring system that includes a plurality of legacy monitoring modules 408. Furthermore, second monitoring system 406 is an upgraded version of first monitoring system 404 that includes a plurality of upgraded monitoring modules 410.

Conversion module 402, in the exemplary embodiment, uses a look-up table that is stored in memory 306 and/or within a remote memory device (not shown) to determine if each hardware component entered by the user is able to be upgraded and/or retrofitted for use in second monitoring system 406. Alternatively, conversion module 402 may use any other data, data structure, and/or device to determine if each hardware component may be upgraded and/or retrofitted, and/or if first monitoring system 404 may be upgraded and/or retrofitted.

In the exemplary embodiment, if conversion module 402 determines that first monitoring system 404 is able to be upgraded, conversion module 402 converts the hardware configuration settings of first monitoring system 404 to configuration data optimized for use in second monitoring system 406. More specifically, in the exemplary embodiment, conversion module 402 converts the hardware list, the configuration parameters, and the configuration parameter values received from user interface module 400 into a software-based list of hardware, configuration parameters, and configuration parameter values that may be used in second monitoring system 406 to substantially reproduce a configuration and/or an operation of first monitoring system 404.

Moreover, in the exemplary embodiment, conversion module 402 generates a report 414 that details the result of the determination, i.e., whether first monitoring system 404 is able to be upgraded and/or retrofitted. The report 414, in the exemplary embodiment, is displayed to the user on display 304 and includes a summary that quantifies and/or determines how closely the configuration and/or the operation of second monitoring system 406 is expected to match a configuration and/or an operation of first monitoring system 404. For example, report 414 may include a list of parameters and parameter values that correspond to each jumper 200, and may include a value that indicates how closely each converted parameter value in second monitoring system 406 is expected to match a respective or similar parameter value in first monitoring system 404. The user may view report 414 and determine whether the converted parameter values are sufficiently similar enough to the parameter values of first monitoring system 404 to justify upgrading or retrofitting monitoring modules 408 and/or first monitoring system 404. Moreover, in the exemplary embodiment, report 414 indicates whether one or more parameter values of first monitoring system 404 are unable to be reproduced within a predefined tolerance range by second monitoring system 406. For example, if first monitoring system 404 is configured to increase a gain of a transducer signal by a factor of 10, and second monitoring system 406 is unable to reproduce the gain of the signal within, for example, one percent (i.e., between 9.9 and 10.1), conversion module 402 may generate an alert indicating that the associated parameter and/or parameter value is not sufficiently reproducible. More specifically, an associated report 414 may indicate that the parameter and/or the parameter value is not sufficiently reproducible, for example, by highlighting the parameter and/or the parameter value in one or more colors and/or fonts, by displaying an alarm graphic proximate to the parameter and/or the parameter value, and/or by any other graphical and/or textual indication. Additionally or alternatively, one or more audio and/or visual alarms and/or alerts may be generated if one or more parameters are unable to be generated within a predefined tolerance range by second monitoring system 406.

If conversion module 402 and/or report 414 indicates that first monitoring system 404 can be upgraded, conversion module 402, in the exemplary embodiment, generates an upgrade component list 416, such as a "bill of materials," itemizing the components that are required to upgrade first monitoring system 404. Moreover, in the exemplary embodiment, conversion module 402 converts the hardware list, the parameters, and/or the parameter values received from user interface module 400 into configuration data associated with one or more hardware and/or software components of second monitoring system 406. Conversion module 402 generates a configuration file 418 that includes the configuration data and stores configuration file 418 in memory 306. Configuration file 418 may be selectively downloaded and/or transmitted to second monitoring system 406 via a data cable (not shown) and/or wirelessly as desired. In the exemplary embodiment, configuration file 418 is used to configure one or more software and/or hardware components of second monitoring system 406, such as to configure one or more monitoring modules 410. More specifically, configuration file 418 is used to program second monitoring system 406 and/or monitoring modules 410 such that the respective parameters and/or settings of second monitoring system 406 and/or monitoring modules 410 cause second monitoring system 406 and/or monitoring modules 410 to be configured and/or to operate substantially similarly to first monitoring system 404 and/or monitoring modules 408. As such, newer and more robust monitoring modules 410 may be used with second monitoring system 406, while providing an automated configuration of second monitoring system 406 based on the configuration of first monitoring system 404.

Moreover, in the exemplary embodiment, first monitoring system 404 monitors the operation of a first machine (not shown). Second monitoring system 406 monitors the operation of the first machine and/or of a second machine (not shown). More specifically, in the exemplary embodiment, a plurality of hardware configuration settings, such as the settings of jumpers 200, are established to enable first monitoring system 404 to monitor the operation of the first machine. A plurality of software configuration settings, such as the configuration data and/or configuration file 418, are established to enable second monitoring system 406 to monitor the operation of the first machine and/or the second machine.

As described herein, conversion system 300 enables a first, or legacy, monitoring system to be retrofitted or upgraded to a second monitoring system. Alternatively, conversion system 300 enables the first monitoring system to be upgraded to use newer and/or upgraded components, such as one or more upgraded monitoring modules. However, at least some known monitoring systems must be upgraded manually. For example, the hardware settings of each monitoring module within the known monitoring system must be recorded and manually input into a new monitoring system and/or into new monitoring modules during an upgrade. In contrast to such known systems that require manual conversion of each individual hardware component and/or hardware configuration setting, conversion system 300 enables an automatic, efficient, and robust conversion from the legacy monitoring system to the upgraded monitoring system. Accordingly, conversion system 300 facilitates decreasing the overall time and cost of upgrading the first monitoring system.

The above-described systems enable a first, or legacy, monitoring system to be converted to a second, or upgraded, monitoring system. The conversion system receives a list of hardware components installed in the legacy monitoring system and a list of configuration settings for each hardware component installed. The conversion system determines whether each hardware component may be upgraded and generates a report that notifies a user of the determination. The conversion system also converts the list of parameter settings into a plurality of software configuration settings for use in the upgraded monitoring system. The software configuration settings are stored within a configuration file for downloading to the upgraded monitoring system as desired.

A technical effect of the systems and method described herein includes at least one of: (a) receiving a plurality of hardware configuration settings from a first monitoring system, wherein the plurality of hardware configuration settings are established to enable the first monitoring system to monitor the operation of a first machine; and (b) converting a plurality of hardware configuration settings from a first monitoring system into a plurality of software configuration settings for use in a second monitoring system, wherein the plurality of software configuration settings are established to enable the second monitoring system to monitor the operation of at least one of a first machine and a second machine.

Exemplary embodiments of a conversion system and method for use in upgrading a monitoring system are described above in detail. The method, conversion system, and monitoring system are not limited to the specific embodiments described herein, but rather, components of the systems and/or steps of the method may be utilized independently and separately from other components and/or steps described herein. For example, the conversion system may also be used in combination with other monitoring systems and methods, and is not limited to practice with only the monitoring system as described herein. Rather, the exemplary embodiments can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for use with a first monitoring system, comprising:
a conversion system comprising a processor configured to execute:

an interface module configured to receive a plurality of hardware configuration settings comprising one or more hardware jumpers of the first monitoring system, wherein the plurality of hardware configuration settings are configured to enable the first monitoring system to monitor the operation of a first machine, and wherein the first monitoring system is configured at least in part according to the plurality of hardware configuration settings by way of the one or more hardware jumpers; and a conversion module coupled to the interface module and configured to convert the plurality of hardware configuration settings into a plurality of software configuration settings for use in a second monitoring system, wherein the plurality of software configuration settings are configured to enable the second monitoring system to monitor the operation of at least one of the first machine and a second machine, and wherein the second monitoring system is configured according to the plurality of software configuration settings and corresponding to the plurality of hardware configuration settings to reproduce the configuration of the first monitoring system on the second monitoring system.

2. The conversion system in accordance with claim 1, wherein the conversion module is configured to determine a compatibility between the first monitoring system and the second monitoring system by determining whether the plurality of hardware configuration settings are able to be at least partially reproduced by the second monitoring system prior to converting the plurality of hardware configuration settings to the plurality of software configuration settings.

3. The conversion system in accordance with claim 2, wherein the conversion module generates an alert if the conversion module determines that the plurality of hardware configuration settings are not able to be at least partially reproduced by the second monitoring system.

4. The conversion system in accordance with claim 2, wherein the conversion module quantifies a difference between operation of the first monitoring system configured with the plurality of hardware configuration settings and operation of the second monitoring system configured with the plurality of software configuration settings.

5. The conversion system in accordance with claim 1, wherein the conversion module generates a list of hardware components required for the second monitoring system to at least partially reproduce the plurality of hardware configuration settings.

6. The conversion system in accordance with claim 1, wherein the conversion module:
generates a file that includes the plurality of software configuration settings; and
selectively downloads the file to the second monitoring system.

7. The conversion system in accordance with claim 6, wherein after the conversion module downloads the file including the plurality of software settings to the second monitoring system, the second monitoring system is enabled to operate similarly to the first monitoring system.

8. A monitoring system conversion assembly comprising:
a first monitoring system that includes a plurality of hardware configuration settings comprising one or more hardware jumpers of the first monitoring system, wherein the plurality of hardware configuration settings are configured to enable the first monitoring system to monitor the operation of a first machine, and wherein the first monitoring system is configured at least in part according to the plurality of hardware configuration settings by way of the one or more hardware jumpers; and
a conversion system comprising:
an interface module configured to receive the plurality of hardware configuration settings; and
a conversion module coupled to the user interface module and configured to convert the plurality of hardware configuration settings into a plurality of software configuration settings for use in a second monitoring system, wherein the plurality of software configuration settings are configured to enable the second monitoring system to monitor the operation of at least one of the first machine and a second machine, and wherein the second monitoring system is configured according to the plurality of software configuration settings and corresponding to the plurality of hardware configuration settings to reproduce the configuration of the first monitoring system on the second monitoring system.

9. The monitoring system conversion assembly in accordance with claim 8, wherein the conversion module is configured to determine a compatibility between the first monitoring system and the second monitoring system by determining whether the plurality of hardware configuration settings are able to be at least partially reproduced by the second monitoring system prior to converting the plurality of hardware configuration settings to the plurality of software configuration settings.

10. A monitoring system conversion assembly in accordance with claim 9, wherein the conversion module generates an alert if the conversion module determines that the plurality of hardware configuration settings are not able to be at least partially reproduced by the second monitoring system.

11. The monitoring system conversion assembly in accordance with claim 9, wherein the conversion module quantifies a difference between operation of the first monitoring system configured with the plurality of hardware configuration settings and operation of the second monitoring system configured with the plurality of software configuration settings.

12. The monitoring system conversion assembly in accordance with claim 8, wherein the conversion module generates a list of hardware components required for the second monitoring system to at least partially reproduce the plurality of hardware configuration settings.

13. The monitoring system conversion assembly in accordance with claim 8, wherein the conversion module:
generates a file that includes the plurality of software configuration settings; and
selectively downloads the file to the second monitoring system.

14. The monitoring system conversion assembly in accordance with claim 13, wherein after the conversion module downloads the file including the plurality of software settings to the second monitoring system, the second monitoring system is enabled to operate similarly to the first monitoring system.

15. A method for upgrading a first monitoring system to a second monitoring system, the method comprising:
receiving a plurality of hardware configuration settings comprising one or more hardware jumpers of the first monitoring system, wherein the plurality of hardware configuration settings are configured to enable the first monitoring system to monitor the operation of a first machine, and wherein the first monitoring system is configured at least in part according to the plurality of hardware configuration settings by way of the one or more hardware jumpers; and converting the plurality of hardware configuration settings into a plurality of software configuration settings for use in a second monitoring system, wherein the plurality of software configuration settings are configured to enable the second monitoring system to monitor the operation of at least one of the first machine and a second machine, and wherein the second monitoring system is configured according to the plurality of software configuration settings and corresponding to the plurality of hardware configuration settings to reproduce the configuration of the first monitoring system on the second monitoring system.

16. The method in accordance with claim 15, further comprising determining a compatibility between the first monitoring system and the second monitoring system by determining whether the plurality of hardware configuration settings are able to be at least partially reproduced by the second monitoring system prior to converting the plurality of hardware configuration settings to the plurality of software configuration settings.

17. The method in accordance with claim 16, further comprising generating an alert if the conversion module determines that the plurality of hardware configuration settings are not able to be at least partially reproduced by the second monitoring system.

18. The method in accordance with claim 16, further comprising quantifying a difference between operation of the first monitoring system configured with the plurality of hardware configuration settings and operation of the second monitoring system configured with the plurality of software configuration settings.

19. The method in accordance with claim 15, further comprising generating a list of hardware components required for the second monitoring system to at least partially reproduce the plurality of hardware configuration settings.

20. The method in accordance with claim 15, further comprising:
- generating a file that includes the plurality of software configuration settings; and
- selectively downloading the file to the second monitoring system.

* * * * *